(12) United States Patent
Qi (10) Patent No.: US 12,438,660 B2
(45) Date of Patent: Oct. 7, 2025

(54) METHODS AND APPARATUS FOR FREQUENCY LAYER CONFIGURATION FOR NR POSITIONING REFERENCE SIGNALS

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 17/766,202

(22) PCT Filed: Sep. 28, 2020

(86) PCT No.: PCT/KR2020/013203
§ 371 (c)(1),
(2) Date: Apr. 1, 2022

(87) PCT Pub. No.: WO2021/066450
PCT Pub. Date: Apr. 8, 2021

(65) Prior Publication Data
US 2023/0045122 A1 Feb. 9, 2023

(30) Foreign Application Priority Data

Oct. 4, 2019 (GB) ...................................... 1914395

(51) Int. Cl.
*H04L 5/00* (2006.01)
*H04W 72/0453* (2023.01)
*H04W 72/23* (2023.01)

(52) U.S. Cl.
CPC ....... *H04L 5/0048* (2013.01); *H04W 72/0453* (2013.01); *H04W 72/23* (2023.01)

(58) Field of Classification Search
CPC ......................... H04L 5/0048; H04W 72/0453; H04W 72/23; H04W 72/231; H04W 72/232

See application file for complete search history.

(56) References Cited

U.S. PATENT DOCUMENTS

| | | |
|---|---|---|
| 2010/0317343 A1 | 12/2010 | Krishnamurthy et al. |
| 2011/0158200 A1 | 6/2011 | Bachu et al. |

(Continued)

FOREIGN PATENT DOCUMENTS

| | | |
|---|---|---|
| CN | 102474402 A | 5/2012 |
| EP | 3471332 A1 | 4/2019 |

(Continued)

OTHER PUBLICATIONS

MCC Support, "Final Report of 3GPP TSG RAN WG1 #86bis v1.0.0 (Lisbon, Portugal, Oct. 10-14, 2016)", 3GPP TSG RAN WG1 Meeting #87, Nov. 14-18, 2016, R1-1611081, 160 pages.

(Continued)

*Primary Examiner* — Kevin C. Harper (57) ABSTRACT

A method for configuring frequency layers is disclosed. Each frequency layer comprises one or more frequency layer parts, wherein each frequency layer part comprises a contiguous set of frequencies defined by a bandwidth and a centre frequency. Positioning Reference Signal (PRS) is mapped to each frequency layer. The method comprises: configuring a first frequency layer for a first cell, wherein the first frequency layer comprises at least one frequency layer part, FL1, having a bandwidth BW1 and a centre frequency CF1; and configuring a second frequency layer for a second cell, wherein the second frequency layer comprises at least one frequency layer part, FL2, having a bandwidth BW2 and a centre frequency CF2.

6 Claims, 3 Drawing Sheets

(56) References Cited

U.S. PATENT DOCUMENTS

| | | | |
|---|---|---|---|
| 2015/0043368 A1 | 2/2015 | Kim et al. | |
| 2015/0245402 A1* | 8/2015 | Mochizuki | H04W 36/22 370/328 |
| 2019/0297489 A1 | 9/2019 | Lei et al. | |
| 2020/0052845 A1* | 2/2020 | Chuang | H04L 5/0048 |
| 2021/0006995 A1* | 1/2021 | Cui | H04W 24/10 |
| 2021/0076359 A1* | 3/2021 | Sosnin | G01S 19/42 |
| 2021/0112522 A1* | 4/2021 | Kim | H04W 64/00 |
| 2021/0120519 A1* | 4/2021 | Si | H04W 64/003 |
| 2022/0191830 A1* | 6/2022 | Khoryaev | H04L 27/261 |
| 2022/0321294 A1* | 10/2022 | Ren | H04W 4/023 |

FOREIGN PATENT DOCUMENTS

| | | |
|---|---|---|
| GB | 2576049 A | 2/2020 |
| KR | 10-2014-0022482 A | 2/2014 |

OTHER PUBLICATIONS

CATT, "NR Positioning Reference Signals for OTDOA", 3GPP TSG RAN WG1 Meeting #95, Nov. 12-16, 2018, R1-1812616, 14 pages.

Huawei et al., "Discussion on PRS measurement", 3GPP TSG-RAN WG4 Meeting #92, Aug. 26-30, 2019, R4-1909690, 5 pages.

Supplementary European Search Report dated Sep. 7, 2022 in connection with European Patent Application No. 20 87 1270, 9 pages.

International Search Report and Written Opinion of the International Searching Authority dated Jan. 8, 2021, in connection with International Application No. PCT/KR2020/013203, 10 pages.

Combined Search and Examination Report dated Mar. 26, 2020, in connection with United Kingdom Application No. GB1914395.7, 2 pages.

Ericsson, "Neighbour Cell NPRS Position Determination," R1-1701886, 3GPP TSG-RAN1 Meeting #88, Athens, Greece, Feb. 13-17, 2016, 5 pages.

Huawei, et al., "Discussion on PRS measurement," R4-1909690, 3GPP TSG-RAN WG4 Meeting #92, Ljubljana, SI, Aug. 26-30, 2019, 5 pages.

Intel Corporation, "On applicability for intra-frequency measurement for NR," R4-1710364, 3GPP TSG-RAN4 Meeting #84bis, Dubrovnik, Croatia, Oct. 9-13, 2017, 5 pages.

Samsung, "DL Reference Signals for NR Positioning," R1-1908509, 3GPP TSG RAN WG1 #98, Prague, CZ, Aug. 26-30, 2019, 10 pages.

Communication pursuant to Article 94(3) EPC dated Oct. 1, 2024, in connection with European Application No. 20871270.3, 6 pages.

Notification of the First Office Action dated Dec. 12, 2024, in connection with Chinese Application No. 202080069887.3, 19 pages.

\* cited by examiner

METHODS AND APPARATUS FOR FREQUENCY LAYER CONFIGURATION FOR NR POSITIONING REFERENCE SIGNALS

CROSS-REFERENCE TO RELATED APPLICATIONS

This application is a 371 National Stage of International Application No. PCT/KR2020/013203, filed Sep. 28, 2020, which claims priority to British Patent Application No. GB1914395.7, filed Oct. 4, 2019, the disclosures of which are herein incorporated by reference in their entirety.

BACKGROUND

1. Field

Certain examples of the present disclosure provide methods, apparatus and systems for configuring one or more frequency layer for Positioning Reference Signals (PRS). For example, certain examples of the present disclosure provide methods, apparatus and systems for configuring one or more frequency layer for PRS in $3^{rd}$ Generation Partnership Project (3GPP) 5th Generation (5G) New Radio (NR).

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹/₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Demand for mobile services is exploding and one of the fastest growing segments is Location Based Services (LBS), primarily driven by two major requirements: emergency services and commercial applications. In response to these needs, second and third generation networks (Wide Band Code Division Multiple Access (WCDMA), Global System for Mobile Communications (GSM), Code Division Multiple Access (CDMA)) have added support for several positioning technologies, which vary in their accuracy and Time to First Fix (TTFF) performance.

3GPP Release 9 for Long-Term Evolution (LTE) defines support for positioning technologies: Extended Cell ID (ECID), Assisted Global Navigation Satellite System (A-GNSS), Observed Time Different Of Arrival (OTDOA) and LTE Positioning Protocol (LPP), a new positioning protocol. A new reference signal, i.e., positioning reference signal (PRS) has been defined in LTE. Further in Rel-11, Uplink Observed Time Different of Arrival (UOTDA) has been adopted using SRS measurement. 3GPP Rel-15 defines support for some Radio Access Technology (RAT)-independent positioning techniques, such as Real Time Kinematic (RTK) GNSS, to improve the accuracy of LTE positioning.

The PRS signals of LTE comprise pseudo-random sequences that are mapped to certain Resource Elements (REs) (e.g. REs that are not allocated to Physical Broadcast Channel (PBCH)). The UE may correlate the received PRS sequences with local copies of the sequences and determine the corresponding ranges (distances) to corresponding base stations based on the positions of the correlation peaks. These ranges allow the UE to determine its position.

In the next 3GPP release, i.e., Rel-16, a new study item/work item (SID/WID) is defined in [RP-171508] to support positioning in NR. The objective of this SID/WID is to evaluate potential solutions to address NR positioning requirements as defined in TR 38.913, TS 22.261, TR 22.872 and TR 22.804 while considering Enhanced 911 (E911) requirements by analysing positioning accuracy (including latitude, longitude and altitude), availability, reliability, latency, network synchronization requirements and/or User Equipment (UE)/Base Station (gNB) complexity to perform positioning, and taking into account a preference to maximize synergy where possible with existing positioning support for Evolved Universal Terrestrial Radio Access Network (E-UTRAN). This SID/WID will study both NR-based RAT-dependent as well as RAT-independent and hybrid positioning methods to address regulatory as well as commercial use cases.

The above information is presented as background information only to assist with an understanding of the present disclosure. No determination has been made, and no assertion is made, as to whether any of the above might be applicable as prior art with regard to the present invention.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

Embodiments or examples disclosed in the description and/or figures falling outside the scope of the claims are to be understood as examples useful for understanding the present invention.

Other aspects, advantages and salient features of the invention will become apparent to those skilled in the art from the following detailed description taken in conjunction with the accompanying drawings.

Accordingly the embodiments herein provide a method configuring frequency layers, wherein each frequency layer comprises one or more frequency layer parts, wherein each frequency layer part comprises a contiguous set of frequencies defined by a bandwidth and a centre frequency, and wherein Positioning Reference Signal (PRS) is mapped to each frequency layer. The method includes configuring a first frequency layer for a first cell, wherein the first frequency layer comprises at least one frequency layer part, FL1, having a bandwidth BW1 and a centre frequency CF1. Further, the method includes configuring a second frequency layer for a second cell, wherein the second frequency layer comprises at least one frequency layer part, FL2, having a bandwidth BW2 and a centre frequency CF2.

According to one embodiment, wherein the BW1 is equal to the BW2 or the BW1 is not equal to the BW2 and wherein the CF1 is equal to the CF2 or the CF1 is not equal to the CF2.

According to one embodiment, wherein each single frequency layer supports one numerology.

According to one embodiment, wherein the first frequency layer comprises n frequency layer parts, FL1-1, FL1-2, . . . , FL1-$n$, having respective bandwidths BW1-1, BW1-2, . . . , BW1-$n$, and respective centre frequencies CF1-1, CF1-2, . . . , CF1-$n$; and wherein the second frequency layer comprises n frequency layer parts, FL2-1, FL2-2, FL2-$n$, having respective bandwidths BW2-1, BW2-2, BW2-$n$, and respective centre frequencies CF2-1, CF2-2, CF2-$n$.

According to one embodiment, wherein the BW1-$x$ is equal to the BW2-$x$ or the BW1-$x$ is not equal to the BW2-$x$, wherein the CF1-$x$ is equal to the CF2-$x$ or the CF1-$x$ is not equal to the CF2-$x$, and wherein x is 1, 2, . . . , n.

According to one embodiment, wherein each single frequency layer supports n numerologies corresponding to the n frequency layer parts.

According to one embodiment, when a User Equipment (UE) is configured with multiple frequency layers, the method further comprises one or more of: configuring a single PRS pattern and/or density within one frequency layer; configuring multiple PRS patterns and/or densities within one frequency layer separated in the frequency and/or time domain; and configuring multiple PRS patterns and/or densities within one frequency layer at least partially overlapping in the frequency and/or time domain.

According to one embodiment, when a User Equipment (UE) is configured with multiple frequency layers, the method further comprises measuring, by the UE, a frequency layer comprising one or more of: a frequency layer containing Synchronisation Signals Block (SSB); a frequency layer with a numerology indicated by SSB; and a frequency layer with the same numerology as the default BandWidth Part (BWP).

DETAILED DESCRIPTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Certain examples of the present disclosure provide methods, apparatus and systems for configuring one or more frequency layer for PRS. For example, certain examples of the present disclosure provide methods, apparatus and systems for configuring one or more frequency layer for PRS in 3GPP 5G New Radio NR. However, the skilled person will appreciate that the present invention is not limited to these examples, and may be applied in any suitable system or standard, for example one or more existing and/or future generation wireless communication systems or standards, including any existing or future releases of the same standards specification, for example 3GPP 5G NR.

The following examples are applicable to, and use terminology associated with, 3GPP 5G NR. However, the skilled person will appreciate that the functionality of the various entities disclosed herein may be applied to corresponding or equivalent entities in other communication systems or standards. Corresponding or equivalent entities may be regarded as entities that perform the same or similar role within a network or system.

It will be appreciated that examples of the present disclosure may be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

Certain examples of the present disclosure may provide a computer program comprising instructions or code which, when executed, implement a method, system and/or apparatus in accordance with any aspect, claim, example and/or embodiment disclosed herein. Certain examples of the present disclosure provide a machine-readable storage storing such a program.

The skilled person will appreciate that the present invention is not limited to the specific examples disclosed herein. For example, the techniques disclosed herein are not limited to 3GPP 5G NR. One or more entities in the examples disclosed herein may be replaced with one or more alternative entities performing equivalent or corresponding functions, processes or operations. One or more further elements or entities may be added to the examples disclosed herein. One or more non-essential elements or entities may be omitted in certain examples. The functions, processes or operations of a particular entity in one example may be divided between two or more separate entities in an alternative example. The functions, processes or operations of two or more separate entities in one example may be performed by a single entity in an alternative example. The order in which operations are performed may be modified, if possible, in alternative examples.

Certain examples of the present disclosure may be provided in the form of an apparatus/device/network entity configured to perform one or more defined operations and/or a method therefor. Certain examples of the present disclosure may be provided in the form of a system comprising one or more such apparatuses/devices/network entities, and/or a method therefor. For example, the skilled person will appreciate that, in certain examples of the present disclosure, frequency layers may be configured by a base station (e.g. gNB). In certain examples of the present disclosure, a method for configuring frequency layers (or a method based on the configured frequency layers) may be carried out in a device (e.g. UE).

Certain examples of the present disclosure provide methods and apparatus for frequency layer configuration for NR positioning reference signals.

LTE positioning has been discussed in Rel-9 and Rel-11. In Rel-15 LTE, some RAT-dependent positioning techniques were agreed. In 3GPP Rel-16 a SID/WID on NR positioning is approved and the objectives of this WID are as follows.

Study and evaluate potential solutions of positioning technologies based on the above identified requirements, evaluation scenarios/methodologies [RAN1]

The solutions should include at least NR-based RAT dependent positioning to operate in both FR1 and FR2 whereas other positioning technologies are not precluded.

Minimum bandwidth target (e.g. 5 MHz) of NR with scalability is supported towards general extension for any applications.

Study of positioning architecture for location services, functional interfaces, protocol, and procedures for supporting NR dependent positioning technologies (if needed; otherwise, need to be confirmed) [RAN2, RAN3]

Rel-15 NR positioning architecture/protocol is a starting point of the discussion while the Release 16 LCS architecture enhancement study in TSG SA side is taken into account.

Common architecture with IoT and hybrid positioning.

The positioning architectures should support standalone NR for both voice and data including IoT service.

IoT use cases, including potential LPP evolution, and efficient/low-complexity signaling are considered while striving for a common architecture.

End-to-end latency is considered to developing positioning architecture.

It has been agreed that the start Physical Resource Block (PRB) of DownLink (DL) PRS Resource is defined relative to Point A and a single Point A for DL PRS resource allocation is provided per frequency layer. UE can be configured with one or multiple frequency layers. Examples of the present disclosure provide configurations for frequency layers.

For DL, PRS may be mapped to Resource Elements (REs) of a frame structure according to any suitable mapping scheme (with PRS mapping patterns at the subcarrier level or at the Resource Block (RB) level).

The frame structure may be used for certain DL Physical Layer channels, for example a Physical Downlink Shared Channel (PDSCH) and a Physical Downlink Control Channel (PDCCH) for transmitting information (e.g. control signals and data) from a base station (e.g. gNB) to one or more mobile devices (e.g. UEs).

The frame may comprises a number of Orthogonal Frequency Division Multiplexing (OFDM) symbols, each OFDM symbol comprising a number of subcarriers (or Component Carriers (CCs)). Each subcarrier of each symbol may be referred to as a Resource Element (RE). The symbols may be thought of as forming a grid of REs with time along one axis of the grid and frequency along the other axis of the grid. A block of REs comprising a number (e.g. 12) of adjacent subcarriers may be defined as a Physical Resource Block (PRB).

UpLink (UL) PRS may be transmitted in a frame structure used for certain UL Physical Layer channels, for example a Physical Uplink Shared Channel (PUSCH) and a Physical Uplink Control Channel (PUCCH) for transmitting information (e.g. control signals and data) from a mobile device (e.g. UE) to a base station (e.g. gNB). UL PRS may be transmitted using the same or a similar mapping pattern as for DL PRS.

In 5G NR, a bandwidth part (BWP) is defined (e.g. in 3GPP TS 38.211 version 15.2.0 Release 15, Section 4.4.5) as a subset of contiguous common PRBs. A UE can be configured with up to four bandwidth parts in the downlink with a single downlink bandwidth part being active at a given time, and up to four bandwidth parts in the uplink with a single uplink bandwidth part being active at a given time.

In 5G NR, the UE is not expected to receive PDSCH, PDCCH, or CSI-RS (except for RRM) outside an active BWP. The UE shall not transmit PUSCH or PUCCH outside an active BWP. For an active cell, the UE shall not transmit SRS outside an active BWP.

The BWP concept allows a UE to operate bandwidth adaption, wherein the UE may selectively operate using either a narrow bandwidth (reducing power consumption) or a wide bandwidth (when a higher data rate is required (e.g. bursty traffic situation)). Also, the BWP concept addresses a situation in which a UE may not be capable of utilising the entire bandwidth available in 5G.

In view of the above requirements, PRS should be mapped to a BWP. Furthermore, BWPs (BWP1 and BWP2) of two different UEs (UE1 and UE2) may completely overlap, partially overlap, or may not overlap. The skilled person will appreciate that the following techniques may be applied to both DL and UL PRS.

In 3GPP 5G NR, numerology refers to the configuration of certain waveform parameters, in particular Cyclic Prefix (CP) size, subcarrier spacing, number of subframes per radio frame, number of slots per subframe, number of OFDM symbols per slot, and applicable frequency range. 3GPP TR 21.915 V15.0.0, Section 5.5.4.1 states the following:

Similar to LTE, OFDM with Cyclic Prefix (CP) is used as the downlink (DL) waveform for NR. In contrast to LTE, OFDM can also be used in the NR uplink (UL) direction. As a complement waveform with lower peak-to-average power ratio (PAPR) to improve UL coverage, DFT-s-OFDM (OFDM with Discrete Fourier Transform precoding) can be used in the uplink although limited to single-layer transmission only.

To cope with various deployment scenarios, NR supports a wide range of carrier frequencies (within two possible ranges) and channel bandwidths.

To allow for such a flexibility, NR uses a flexible frame structure, with different Subcarrier Spacings (SCS). The SCS is the distance between the centres of two consecutive subcarriers, and the possible values for SCS are (in kHz): 15; 30; 60; 120 and 240. This is referred to as "multiple numerologies".

Examples of the present disclosure utilise a concept of Frequency Layer (FL). This may be regarded as similar in some respects to the concept of BWP mentioned above and/or to the concept of frequency layer in LTE. In 3GPP TS 36.302 V12.4.0 Release 12, Section 3.1, frequency layer is defined as a set of cells with the same carrier frequency.

In examples of the present disclosure, a frequency layer may be regarded as a defined set of frequencies allocated to a set of one or more cells in a network. PRS may be mapped to REs within a frequency layer. The set of frequencies constituting a frequency layer may be contiguous or non-contiguous. A contiguous block of frequencies constituting a frequency layer may be defined as a frequency layer part. Accordingly, a frequency layer may comprise one or more frequency layer parts, each frequency layer part comprising a contiguous block of frequencies. Each frequency layer part may be defined by a bandwidth and centre frequency (or equivalent parameters). If a frequency layer comprises only a single frequency layer part, the frequency layer and frequency layer part may be regarded as the same.

In certain examples of the present disclosure, a first frequency layer comprising a set of one or more frequency layer parts may be allocated to each of a first set of one or more cells, and a second frequency layer comprising a set of one or more frequency layer parts may be allocated to each of a second set of one or more cells.

The frequency layer parts constituting a given frequency layer may be non-overlapping. The frequency layer parts constituting a given frequency layer may have the same bandwidth or different bandwidths.

In certain examples, the frequency layer parts constituting a given frequency layer may be the same as the frequency layer parts constituting a different frequency layer. In certain examples, some or all of the frequency layer parts constituting a given frequency layer may be different from the frequency layer parts constituting a different frequency layer. In certain examples, there may be at least some overlap (e.g. partial overlap or full overlap) between frequency layer parts constituting a given frequency layer and frequency layer parts constituting a different frequency layer. In other examples, frequency layer parts constituting a given frequency layer may not overlap frequency layer parts constituting a different frequency layer.

For example, a first frequency layer part constituting a first frequency layer may be the same (e.g. have the same bandwidth and centre frequency) as a second frequency layer part constituting a second frequency layer.

For example, a first frequency layer part constituting a first frequency layer may be different (e.g. have a different bandwidth and/or a different centre frequency) from a first frequency layer part constituting a second frequency layer. In one example, the first and second frequency layer parts may have the same centre frequency, but the first frequency layer part may have a larger or smaller bandwidth than the second frequency layer part. In another example, the first and second frequency layer parts may have different centre frequencies, but the first and second frequency layer parts may have the same bandwidth, which may result in no overlap, partial overlap or full overlap between the first and second frequency layer parts depending on the common bandwidth of the frequency layer parts and the centre frequency offset between the frequency layer parts. In another example, the first and second frequency layer parts may have different centre frequencies and different bandwidths, which may result in no overlap, partial overlap or full overlap between the first and second frequency layer parts depending on the bandwidths of the frequency layer parts and the centre frequency offset between the frequency layer parts.

Various examples for configuring frequency layers are described below. The skilled person will appreciate that the examples disclosed herein are not exhaustive, and that other configurations may be used.

Single Frequency Layer Configuration

For each single frequency layer, there are two alternative (Alt) configuration options:
- Alt1: only one numerology is supported by a single frequency layer;
- Alt2: multiple numerologies can be supported by a single frequency layer.

One Numerology

Figure 1A:
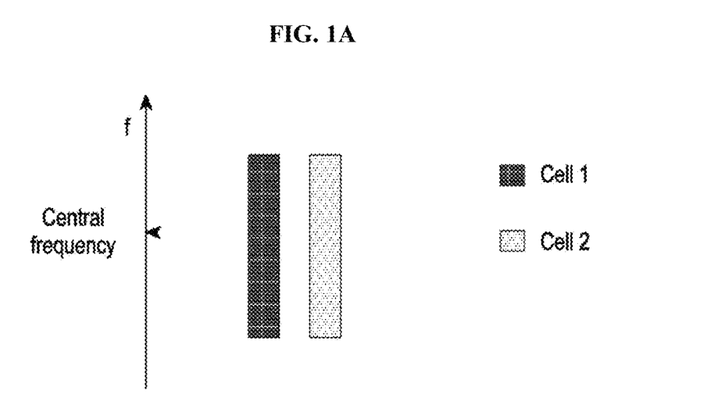
FIGS. 1A, 1B, and 1C illustrate various frequency layer configurations for PRS in the case of one numerology supported by a single frequency layer in certain examples of the present disclosure.
Figure 1B:
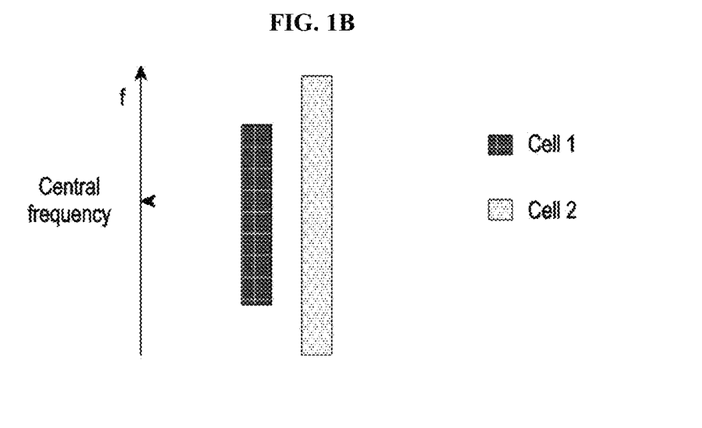
Figure 1C:
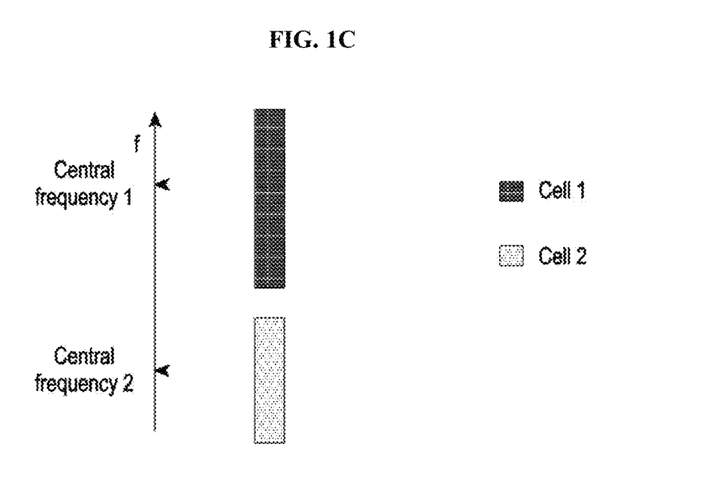

For Alt1, the PRS resource may be configured as in the following Alts:
- Alt1a: the same frequency location and bandwidth are configured for each frequency layer as shown in FIG. 1A;
- Alt1b: the same central frequency location or edge frequency location is configured for each frequency layer but different bandwidth can be configured as shown in FIG. 1B;
- Alt1c: both central frequency location or edge frequency location and bandwidth can be configured differently for each frequency layer as shown in FIG. 1C.

An advantage of Alt1a is a reduction in complexity since the frequency layers have the same location and bandwidth. An advantage of Alt1c is that interference between cells is reduced since the frequency layers do not overlap. Alt1b may be applied in cases where UE capability is such that the bandwidth of a frequency layer should be restricted.

Multiple Numerologies

Figure 2A:
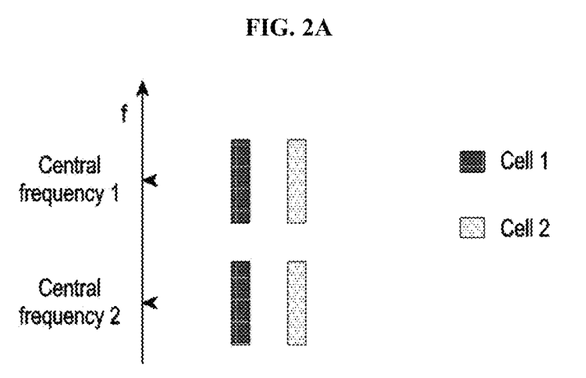
FIGS. 2A, 2B, and 2C illustrate various frequency layer configurations for PRS in the case of multiple numerologies supported by a single frequency layer in certain examples of the present disclosure.
Figure 2B:
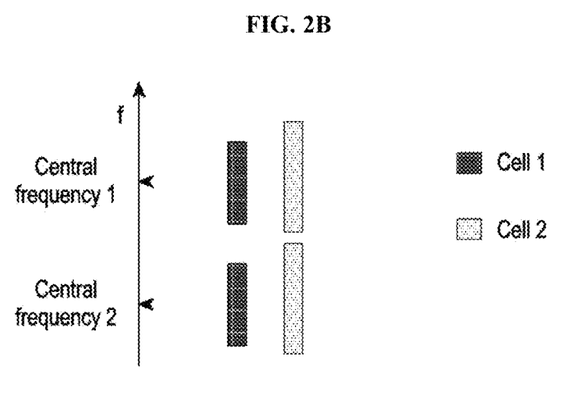
Figure 2C:
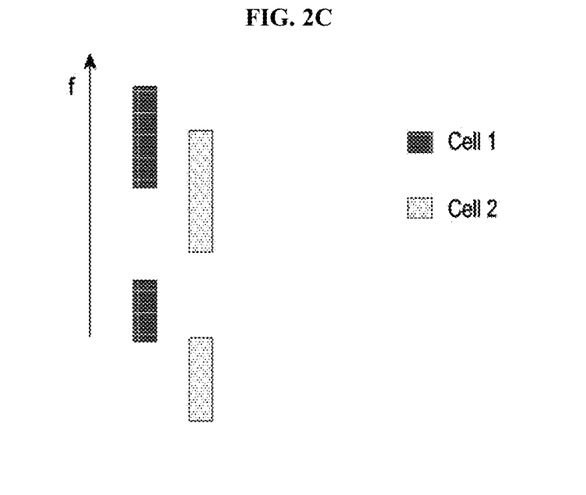

For Alt2, the PRS resource may be configured as in the following Alts:
- Alt2a: multiple frequency locations may be configured, each corresponding to one numerology, but the same frequency location and bandwidth are configured for each numerology within each frequency layer as shown in FIG. 2A;
- Alt2b: multiple frequency locations may be configured, each corresponding to one numerology, but the same central frequency location or edge frequency location is configured for each numerology within each frequency layer, however different bandwidths can be configured for each numerology within each frequency layer, as shown in FIG. 2B;
- Alt2c: both central frequency location or edge frequency location and bandwidth may be configured differently for each numerology within each frequency layer as shown in FIG. 2C.

Multiple Frequency Layer Configuration

One UE may be configured with N frequency layers. However, at one time, only limited number, denoted as K, of frequency layers can be activated for each UE. Both N and K should depend on UE capability and should be reported in UE capability report. One example is similar to BWP configuration, i.e., up to 4 frequency layers can be configured for a UE but only one frequency layer can be activated at one time.

K may also depend on if measurement gap is configured. If measurement gap is not configured, UE measurement is confined within active BWP. In such a case, it is not likely for the UE to measure multiple frequency layers. However, if measurement gap is configured, UE measurement can be outside the active BWP. Therefore, UE may be capable of measuring multiple (more than 1) frequency layers at one time depending on UE capability.

Another issue is which frequency layer is the one UE should measure by default when multiple frequency layers are configured. The following Alts may be considered:
- Alt1: the frequency layer containing Synchronisation Signal Block (SSB);
- Alt2: the frequency layer with the numerology indicated by SSB;
- Alt3: the frequency layer with the same numerology as the default BWP.

In addition to above proposals, frequency layer configurations may also depend on other factors, for example PRS pattern/density, and the following Alts may be considered:
- Alt1: A single PRS density/pattern is configured within one frequency layer;
- Alt2: multiple PRS densities/patterns are configured within one frequency layer but they are separated in frequency/time domain;
- Alt3: multiple PRS densities/patterns are configured within one frequency layer but they are allowed to be partially overlap in frequency/time domain.

Figure 3:
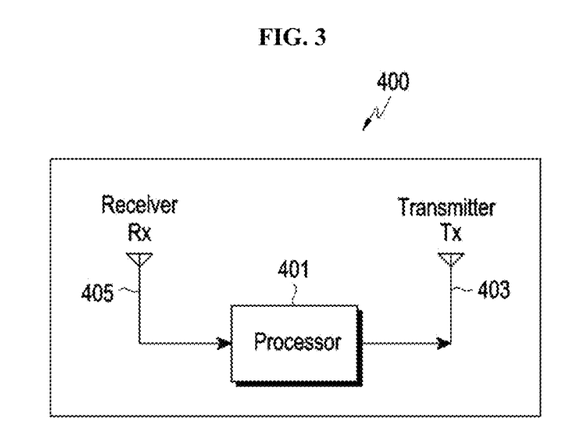
FIG. 3 is a block diagram of an apparatus according to an example of the present disclosure.

FIG. 3 is a block diagram of an exemplary network entity that may be used in examples of the present disclosure. The skilled person will appreciate that the network entity illustrated in FIG. 3 may be implemented, for example, on dedicated hardware, as a software instance running on a dedicated hardware, or as a virtualised function instantiated on an appropriate platform, e.g. on a cloud infrastructure.

The entity 400 comprises a processor (or controller) 401, a transmitter 403 and a receiver 405. The receiver 405 is configured for receiving one or more signals from one or more other network entities. The transmitter 403 is configured for transmitting one or more signals to one or more other network entities. The processor 401 is configured for performing operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

While the invention has been shown and described with reference to certain examples, it will be understood by those skilled in the art that various changes in form and detail may be made therein without departing from the scope of the invention, as defined by the appended claims.

The invention claimed is:

1. A method of a user equipment (UE) in a wireless communication system, the method comprising:
   receiving, from a network entity, configuration information for multiple frequency layers, wherein each frequency layer of the multiple frequency layers corresponds to contiguous frequencies allocated to one or more cells associated with the each frequency layer and includes resources to which a positioning reference signal (PRS) is mapped; and
   receiving, from one or more cells, the PRS based on the configuration information,
   wherein the each frequency layer is configured to support a single numerology and a single PRS density, the single numerology being associated with a value of a subcarrier spacing (SCS) configuration,
   wherein a start physical resource block (PRB) for the each frequency layer is defined relative to point A, and the point A for PRS resource allocation is provided per frequency layer, and up to 4 frequency layers are configurable for the UE,
   wherein K frequency layers among the multiple frequency layers are activated for the UE based on whether a measurement gap is configured or not,
   based on the measurement gap not being configured, the UE is capable of measuring for a frequency layer within an active bandwidth part (BWP), and
   based on the measurement gap being configured, the UE is capable of measuring outside the active BWP and measuring frequency layers at one time depending on UE capability.

2. The method of claim 1, wherein the numerology is associated with a value of a cyclic prefix (CP) configuration.

3. The method of claim 1, wherein the each frequency layer has the same bandwidth and the same frequency location.

4. A user equipment (UE) in a wireless communication system, the UE comprising:
   a transceiver; and
   a controller coupled with the transceiver and configured to:
      receive, from a network entity, configuration information for multiple frequency layers, wherein each frequency layer of the multiple frequency layers corresponds to contiguous frequencies allocated to one or more cells associated with the each frequency layer and includes resources to which a positioning reference signal (PRS) is mapped; and
      receive, from one or more cells, the PRS based on the configuration information,
   wherein the each frequency layer is configured to support a single numerology and a single PRS density, the single numerology being associated with a value of a subcarrier spacing (SCS) configuration,
   wherein start physical resource block (PRB) for the each frequency layer is defined relative to point A, and the point A for PRS resource allocation is provided per frequency layer, and up to 4 frequency layers are configurable for the UE,
   wherein K frequency layers among the multiple frequency layers are activated for the UE based on whether a measurement gap is configured or not,
   based on the measurement gap not being configured, the UE is capable of measuring for a frequency layer within an active bandwidth part (BWP), and
   based on the measurement gap being configured, the UE is capable of measuring outside the active BWP and measuring frequency layers at one time depending on UE capability.

5. The UE of claim 4, wherein the numerology is associated with a value of a cyclic prefix (CP) configuration.

6. The UE of claim 4, wherein the each frequency layer has the same bandwidth and the same frequency location.

* * * * *